May 5, 1964
E. J. MORNINGSTAR
3,131,418
EXPLOSIVE BEARING CLEANOUT
Filed April 9, 1963
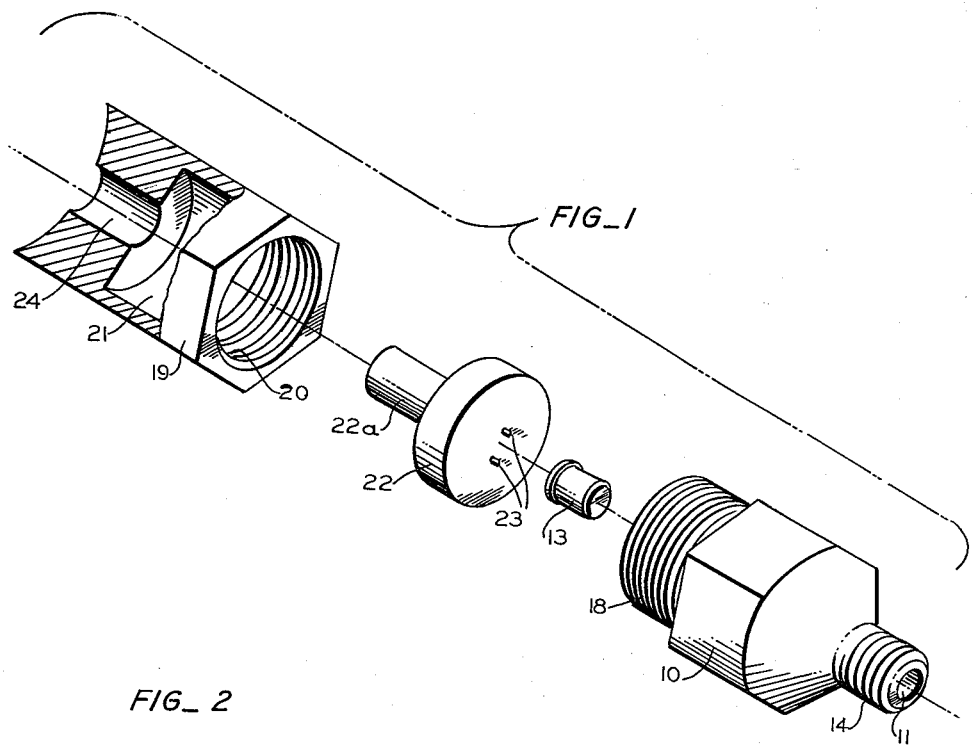
FIG_1
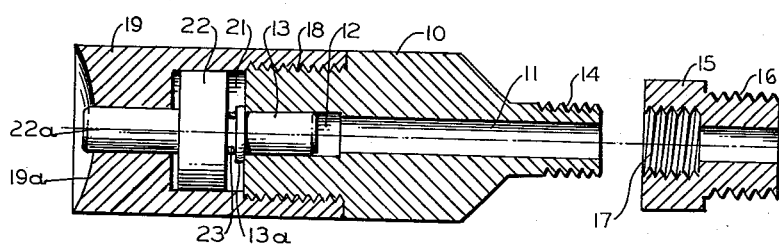
FIG_2
INVENTOR.
ELBERT J. MORNINGSTAR
BY
ATTORNEYS

3,131,418
EXPLOSIVE BEARING CLEANOUT
Elbert James Morningstar, 2350 Westgate Ave., San Jose, Calif.
Filed Apr. 9, 1963, Ser. No. 271,662
3 Claims. (Cl. 15—406)

This invention relates to a bearing obstruction ejector employing blank cartridges.

An object of this invention is to provide an improved bearing obstruction ejector which employs a blank cartridge for removing hardened grease and other obstruction from the passageway through which grease or other lubricant is fed to a machine bearing.

Another object is to provide an improved device employing a blank cartridge for cleaning out the hardened grease or other obstruction material from the passageway through which grease or other lubricant is supplied to a machine bearing, said device being constructed in such a way that accidentally dropping it with a blank cartridge in place therein cannot cause said blank cartridge to go off.

Still another object of this invention is to provide an improved bearing obstruction cleaning device which employs a blank cartridge for producing a sudden and extremely high pressure in the grease or lubricant supplying passage leading to the bearing so that hardened grease and other obstructing material is removed from said passage, said device being constructed so that the sudden and extremely high explosive pressure is caused to go into said grease or lubricant passage and cannot backfire in the device.

Other and further objects of this invention will be apparent to those skilled in the art to which it relates from the following specification, claims and drawing in which, briefly:

FIG. 1 is an exploded view of an embodiment of this invention; and

FIG. 2 is a sectional view taken through the length of the assembled device.

Referring to the drawing in detail, there is illustrated in FIG. 1 an exploded view of an embodiment of this invention in which all the parts are lined up along the axis thereof. This device includes a body member 10 which is of hexagonal or other shape suitable for gripping with a wrench so that the threaded extension 14 thereof may be inserted into the grease receiving fitting leading to the grease or lubricant conveying passageway to the machine bearing. A hole 11 extends through the length of the body 10 and opens out of the threaded end portion 14 which is the outlet end of the device. The other end of this hole is of enlarged diameter, such that the blank cartridge 13 fits into it. The flange 13a of the cartridge abuts the lip of the enlarged hole 12. Thus the flange 13a is positioned outside of the body 10 and may be gripped by a suitable tool such as a knife for removal of the empty cartridge after firing same.

A fitting 15 is provided to this device for the purpose of attaching the device to grease receiving openings which may be of a larger diameter than that of the end 14. This fitting is provided with internal threads 17 in one end portion thereof for receiving end 14 of the device, and it is also provided with external threads 16 which are adapted to be received in the larger grease receiving opening.

The body 10 is also provided with external threads 18 to which the cap member 19 is threaded. The cap member is provided with a cavity 21 for receiving the plunger 22 which fits smoothly into this cavity. The cap member 19 is also provided with an axially disposed hole therethrough for receiving the rod 22a of the plunger 22. The plunger 22 is also provided with two firing pins 23 which are spaced apart so as to engage substantially diametrically opposed parts of the rim of the cartridge 13 adjacent to the flange 13a. Thus when the outer end of the rod 22a of the plunger is given a sharp blow with a hammer or the like, the firing pins 23 are caused to impact the rim portions of the cartridge 13 and set the explosive charge in this cartridge off to produce a sudden and extremely high pressure in the bore 11 of the body 10. This high pressure is guided into the lubricating passage leading to the machine bearing so that obstructions in this passage are forced out and thereafter lubricant may be efficiently applied to the machine bearing through this passage.

Any back pressure developed from the explosive charge in the cartridge 13 is applied to the plunger 22 which is forced against the back of the cavity 21. Very little space is left between the plunger 22 and the back wall of the cavity 21 so that only slight movement of the plunger is possible when the cap 19 is threaded onto the body 10 and tightened thereto. Practically no back pressure can come out of the device through the angular path around the plunger 22 and rod 22a.

The cap 19 is also provided with a cavity 19a which surrounds the outer end portion of the rod 22a so that this outer end portion of the rod 22a is protected from coming in contact with the hard floor, such as concrete, in case the loaded device is accidentally dropped. Other safety features may be provided to this device if desired. Thus a suitable hole may be provided through the cap 19 and the rod 22a for receiving a pin, for example, for holding the plunger 22 immobilized in its withdrawn position until the pin is removed, thereby preventing firing of the blank cartridge 13 accidentally.

While I have shown a preferred embodiment of the invention it will be understood that the invention is capable of variation and modification from the form shown so that its scope should be limited only by the scope of the claims appended hereto.

What I claim is:

1. In a bearing obstruction ejecting device for producing sudden extremely high pressure in the lubricant receiving passage leading to the bearing from which obstructing material such as hardened grease, dirt and the like are to be ejected, the combination comprising a body member having a bore extending therethrough and opening in a threaded end of said body member, said threaded end adapted to be threaded into a lubricant receiving passage leading to the bearing, the inner end portion of said bore receiving a blank cartridge with the rim of said cartridge positioned on the outside of said bore and engaging the lip thereof, a cap threaded to the other end of said body, said cap having a cavity into which the rim of said cartridge projects, a plunger fitting into said cavity, said plunger having a diameter substantially greater than the diameter of said cartridge, firing pin means attached to the side of said plunger adjacent to said cartridge, a rod attached to the other side of said plunger, said rod extending through a bore in said cap to the outside thereof so that said rod is exposed a small part of its length, the cartridge being fired when said exposed end of said rod is struck a sharp blow, the outside of said cap around the exposed end of said rod being recessed so that said cap forms a wall around said exposed end of said rod to prevent accidental firing of said cartridge if the device is dropped on a hard floor.

2. In a bearing obstruction ejecting device for producting sudden extremely high pressure in the lubricant receiving passage leading to the bearing from which obstructing material such as hardened grease, dirt and the like are to be ejected, the combination comprising a body member having a bore extending therethrough and opening in a threaded end of said body member, said threaded end adapted to be threaded into a lubricant receiving passage leading to the bearing, the inner end portion of said bore receiving a blank cartridge, a cap threaded to the other end of said body, said cap having a cavity into which the rim of said cartridge projects, a plunger fitting into said cavity, a rod attached to the other side of said plunger, said rod having a substantially smaller diameter than said plunger, said plunger having a diameter substantially greater than the diameter of said cartridge so that back pressure developed when said cartridge is fired is released only through a confined serpentine path around said plunger, firing pin means attached to the side of said plunger adjacent to said cartridge, said rod extending through a bore in said cap to the outside thereof so that said rod is exposed a small part of its length, the cartridge being fired when said exposed end of said rod is struck a sharp blow, the outside of said cap around the exposed end of said rod being recessed so that said cap forms a wall around said exposed end of said rod to prevent accidental firing of said cartridge if the device is dropped on a hard floor.

3. In a bearing obstruction ejecting device for producing sudden extremely high pressure in the lubricant receiving passage leading to the bearing from which obstructing material such as hardened grease, dirt and the like are to be ejected, the combination comprising a body member having a bore extending therethrough and opening in a threaded end of said body member, said threaded end adapted to be threaded into a lubricant receiving passage leading to the bearing, the inner end portion of said bore receiving a blank cartridge with the rim of said cartridge positioned on the outside of said bore and engaging the lip thereof, a cap threaded to the other end of said body, said cap having a cavity into which the rim of said cartridge projects, a plunger fitting into said cavity, firing pin means attached to the side of said plunger adjacent to said cartridge for engaging the rim portion of said cartridge, a rod attached to the other side of said plunger, said rod extending through a bore in said cap to the outside thereof so that said rod is exposed a small part of its length, the cartridge being fired when said exposed end of said rod is struck a sharp blow, the outside of said cap around the exposed end of said rod being recessed so that said cap forms a wall around said exposed end of said rod to prevent accidental firing of said cartridge if the device is dropped on a hard floor.

References Cited in the file of this patent
UNITED STATES PATENTS

| | | |
|---|---|---|
| 2,102,320 | Kandarian | Dec. 14, 1937 |
| 2,494,298 | Jones | Jan. 1, 1950 |